United States Patent Office
3,451,948
Patented June 24, 1969

3,451,948
METHOD OF TREATING FLUIDIZABLE PARTICLES
Charles E. Scott, Chester, Pa., assignor to Air Products and Chemicals, Inc., Philadelphia, Pa., a corporation of Delaware
No Drawing. Filed June 21, 1966, Ser. No. 559,070
Int. Cl. C01b 33/28
U.S. Cl. 252—455          5 Claims

ABSTRACT OF THE DISCLOSURE

Calcined kaolin is transformed into a mixture of crystalline sodium zeolite and amorphous aluminosilicate, which finely comminuted mixture is dispersed in aqueous sodium silicate and spray-dried. The spray-dried particles are rapidly mixed with an aqueous solution containing anions of a strong acid stoichiometrically equivalent to 60–110% of the sodium ion of the sodium silicate to provide a pH 5.5–8.5 solution. Then the particles are ion-exchanged by counter-current flow of hot ammonium salt solution, thus providing fluidizable particles comprising crystalline ammonium zeolite in an amorphous aluminosilicate matrix.

---

This invention relates to the preparation of particles comprising zeolitic components which are subjected to an ion exchange step.

In the manufacture of cracking catalyst particles, it has long been known that a composition comprising a sodium zeolite in an aluminosilicate matrix can be subjected to ammonium exchange to prepare a supported ammonium zeolite, and that a cracking catalyst can be prepared by thermal treatment of an ammonium zeolite. For example, Bates 2,283,173 describes such a procedure as applied to an amorphous, gelatinous synthetic silica-alumina zeolite. In the manufacture of fluidizable cracking catalyst previous workers ordinarily have conducted the ion exchange step prior to spray drying of an aqueous slurry. However, in the development of the present invention, it was established that, in producing a cracking catalyst comprising a crystalline zeolite in an aluminosilicate matrix, advantages are attained by postponing the ion exchange step until subsequent to the spray drying step.

In accordance with the present invention a slurry comprising crystalline sodium zeolite associated with aluminosilicate matrix is prepared by admixing with water and sodium silicate (precursor for binder); and the admixed slurry is spray dried to prepare solid fluidizable particles. These particles are treated with an aqueous solution having sufficient acidity for stoichiometrically reacting with a significant portion of the sodium derived from the sodium silicate, the mixing of the acid and particles being so rapid that the binder within the particles is converted from silicate to silica. Among other beneficial effects this acid treatment imparts greater physical strength to the fluidizable particles so that thereafter they can withstand aqueous solutions and the ion exchange steps with less disintegration than in the absence of the acid treatment step. The acid treated fluidizable particles are subjected to base exchange treatment with hot aqueous solution of an ammonium salt having an acid reaction to prepare supported ammonium zeolite. This ion exchange treatment is conducted under counter-current conditions regulated so that the recovery of treated solids constitutes the bulk of the solids charged to the treatment and loss of product by entrainment within the liquid effluent from the ion exchange step is not a prohibitively large proportion of the ion exchanged material. The ammonium exchanged fluidizable particles are desirably washed with water to remove excess ammonium salt.

The nature of the invention is further clarified by reference to descriptions of several illustrative preparations of fluidizable particles, and to examples of the counter-current ion exchange operation.

PREPARATION A

Commercially available granular pellets of a cracking catalyst have an elemental analysis of about 2% volatile matter, 53% $SiO_2$, and 45% $Al_2O_3$, and are known to have been prepared from a precursor comprising sodium faujasite having a $SiO_2$ to $Al_2O_3$ molar ratio of about 4.4:1. Said pellets are subjected to a hammer mill having an air elutriator for withdrawing particles having average diameters less than about 200 microns. The thus elutriated product from the hammer mill is mixed with an equal weight of ball milled fines of the same cracking catalyst composition, said fines having an average particle diameter of about 1 micron. The mixture is tumbled for about an hour to grind off many of the irregular edges of the product from the hammer mill, and to produce moderately round particles. Particles smaller than about 1 micron elutriated from the tumbler to provide fines suitable for recycling and/or other purposes, and then a fraction having diameters of the 2 to 30 micron range is elutriated from the tumbler, providing a residue consisting of at least partially spheroidized particles about 30–150 microns in diameter. These 30–150 micron particles are fluidized for several hours, during which undersized particles are removed. The thus prepared microspheres of the 30–150 micron diameter range are fluidizable cracking particles having cracking characteristics closely resembling those of the granular particles from which they are prepared by various stages of grinding. However, the undersized particles (i.e., particles less than about 30 microns) produced as a by-product of the various stages of grinding pellets must be utilized to bring the price of the fluidizable catalyst within a price range similar to that of other fluidizable catalysts.

The particles less than about 30 microns are ball milled to produce particles generally less than about 10 microns. To an aqueous dispersion of the ball milled particles, sufficient sodium silicate is added to provide, on the basis of the ultimate catalyst, an additional 12% silica as binder. The resulting composition is a mixture which can be described as comprising water, sodium faujasite, aluminosilicate matrix, and sodium silicate binder. This mixture is spray dried at about 450° C. at the conditions required for the formation of dried particles having a size range from about 15 to about 150 microns. The above description of the preparation of dried fluidizable particles comprising sodium silicate and sodium faujasite in an aluminosilicate matrx illustrates that such particles can be prepared starting from commercially available materials without reference to the details of preparation of sodium faujasite.

PREPARATION B

Following a procedure such as set forth in the applicationo of Lee A. Cosgrove Ser. No. 463,860 filed June 14, 1965, pellets of an intermediate product may be prepared as follows:

"A dry blend of plastic kaolin, partially mullitized kaolin, and meta kaolin is prepared as follows, the quantities being those intended to yield, in view of mechanical and other losses, about 100 kg. of cracking catalyst:

|  | Kg. |
|---|---|
| Plastic Kaolin | 73.09 |
| Partially mullitized kaolin | 31.33 |
| Meta kaolin | 5.22 |
| Dry blend | 109.64 |

An aqueous solution containing about 17.8% by weight sodium hydroxide (about 5 Normal, about 1.19 density or about 21.5 H$_2$O/Na$_2$O ratio) is prepared, and admixed with the three component clay in a conventional ribbon blender. The initial paste resulting from conventional mixing of 42.12 kg. of solution (containing 5.82 kg. Na$_2$O) and 109.64 kg. of clays is a composition which ceramic engineers would expect to extrude easily. Mixtures of kaolin clay and water have been extruded and shaped as a plastic clay so satisfactorily as to be a standard of comparison. Aqueous sodium hydroxide has long been recognized as imparting ease of extrusion to clays. The combination of plastic clay and aqueous sodium hydroxide would be expected to provide easy extrusion."

"Particular attention is directed to the feature of employing high pressure to transform the alkalinized clay into a plastic dough having a composition (summation of previous data) as follows:

| | |
|---|---|
| Na$_2$O | 5.82 |
| Aluminum disilicate: | |
| Plastic kaolin | 62.90 |
| Partially mullitized kaolin | 31.23 |
| Meta kaolin | 5.19 |
| Total aluminum disilicate | 99.31 |
| Water: | |
| H$_2$O from aluminum disilicate | 10.33 |
| From NaOH | 1.69 |
| Solution | 34.61 |
| Total H$_2$O | 46.63 |
| Total dough | 151.76 |

The mols of components in such composition corresponds to:

| | |
|---|---|
| Al$_2$O$_3$ | 0.447 |
| SiO$_2$ | 0.895 |
| Na$_2$O | 0.0937 |
| H$_2$O | 2.595 |

Zeolites are conventionally evaluated with reference to the presence of one mol of alumina so these proportions provide:

| | |
|---|---|
| Al$_2$O$_3$ | 1.00 |
| SiO$_2$ | 2.00 |
| Na$_2$O | 0.21 |
| H$_2$O | 5.80 |

The unit mol ratios for the dough are as follows:

| | |
|---|---|
| H$_2$O/Al$_2$O$_3$ | 0.21 |
| SiO$_2$/Al$_2$O$_3$ | 2.0 |
| H$_2$O/Na$_2$O | 27.6 |
| H$_2$O/Al$_2$O$_3$ | 5.80 |
| Al$^{+++}$/Na$^+$ | 4.77 |

If the partially mullitized silica were treated as a mixture of silica, mullite, and meta kaolin, and if the mullite were then ignored, some of the ratios would then be different from those based upon the more valid assumption that no portion of the reaction mixture is absolutely inert in the reaction.

The high pressure mixing must be continued for from 5 to 50 minutes in order to transform the initial mixture into plastic composition suitable for reliable extrusion."

"After a bed of granular particles has been formed in a tank, the tank is filled with a mineral oil having a high flash point and a viscosity comparable to a light lubricating oil. The particles age at a temperature conveniently designated as ambient temperature. Heat is generated by the reaction of the alkali and clay components and the aging oil may be circulated through a heat exchanger to maintain the temperature within the range (usually the upper portion thereof) from about 10° C. to about 40° C., which is substantially the same temperature range in the plant attributable to variations in the weather. Such aging at ambient temperature is continued for about 24 hours. A circulating pump directs the oil through a heat exchanger, whereby the temperature of the granules is increased from ambient temperature to about 95° C. during a one hour period, and maintained at this temperature for about 24 hours."

The hot aged pellets are subjected to grinding in a hammer mill and then to ball milling to provide an aqueous dispersion in which the average particle size is less than about 1 micron. An aqueous solution of sodium silicate is added to the aqueous dispersion of the ball milled composition (the sodium silicate providing about 12% silica binder in the finished catalyst) and the mixture is spray dried to provide fluidizable particles having a size range from about 15 to about 150 microns in diameter.

PREPARATION C

A kaolin clay is ball milled to provide particles having a mean particle diameter of about 1 micron. To an aqueous dispersion of the small size kaolin particles, sufficient sodium faujasite (commercially available as a molecular sieve) is added to provide a composition such that the completed catalyst contains approximately 12% hydrogen faujasite. Sufficient aqueous sodium silicate (4:1 silica to sodium oxide weight ratio) is added as a binder to provide in the ultimate cracking catalyst composition about 12% silica. An aqueous dispersion is spray dried to provide fluidizable particles having diameters in the range from about 15 microns to about 150 microns.

Example 1

Fluidizable solids prepared by the general procedure described in Preparation B and consisting of 15–150 micron size particles having a composition including sodium faujasite, sodium silicate, and an aluminosilicate matrix were dispersed in about 100 g. of agitated mixture of sulfuric acid and distilled water. The weight of the sulfuric acid was 5.8 g., providing sufficient sulfuric acid for reaction with about 80% of the sodium attributable to the sodium silicate in the 31.9 g. of the solids (that is the weight after allowing for the ignition loss). The reaction mixture was stirred for approximately 1 hour during which the temperature was within a range from about 30–40° C. At the end of the hour of agitation, the pH of the solution was about 8.5. The solids were separated from the slurry and it was established that about 80% of the sodium attributable to the sodium silicate had been extracted from the fluidizable particles. Moreover, the faujasite content of the acid treated particles was quite close to the zeolite content prior to the acid treatment.

The particles were slurried with water and pumped to a column in which the particles slowly settled by gravity through an upflowing stream of hot ammonium nitrate solution. The diameter of the column was significantly enlarged above the point of injection of the catalyst slurry in an effort to minimize the entrainment of fluidizable cracking catalyst particles in the depleted ammonium exchange solution withdrawn from the top of the column. The fluidizable catalyst particles settled downwardly through the ammonium nitrate solution and were withdrawn from the column for treatment in a washing step. The ammonium nitrate solution was injected at the bottom of the column at a rate permitting the fluidizable particles to settle therethrough in less than an hour.

The rinsing of the excess ammonium nitrate solution from the exchanged particles was conducted by washing the filter cake collected on a vacuum filtration apparatus (e.g., a Buchner funnel).

Measurements of the liquid effluent from the top of the exchange column indicated that the slowly upflowing ammonium nitrate solution suspended only a very small proportion of the particles. The major quantity of the fluidizable particles settled gravitationally through the principal countercurrent zone.

The water washed particles were analyzed and it was established that the residual sodium as sodium oxide of the fluidizable catalyst was reduced to less than 2% by weight, thus meeting the specifications deemed appropriate for faujasite containing cracking catalysts.

Example 2

There is a tendency for the sodium silicate in the dried fluidizable particles to dissolve upon immersion in an aqueous system. If however, the sodium silicate within the particle is converted to silica binder promptly, a rugged fluidizable particle can be prepared. Such conversion from sodium silicate to silica is accomplished by treatment with aqueous acid. If the acid treatment is batchwise and involves aqueous solutions containing, for example 1 N acid, some of the crystalline zeolite may be destroyed. If the acid treatment is batchwise and involves proportions such that the final pH of the mixture is about 12, conversion of sodium silicate to silica binder is incomplete and the attrition resistance of the cracking catalyst is impaired. By a series of tests it is established that the final pH in batchwise stabilization should desirably be about 7 and must be higher than 4.0 and lower than 11.0. Continuous maintenance of a pH from about 5.5 to about 8.5 desirably 6.2 to 7.8 permits more satisfactory operation of the step of stabilizing the binder within the particles.

A vessel is equipped with a central drain which can be regulated for continuous or intermittent withdrawal of a slurry from the bottom of the vessel. A stirring device assures reasonably rapid mixing of the contents within the vessel. A glass electrode is positioned at a height of about ⅔ of the normal depth of the aqueous suspension, and the measurements of the pH of the system at the glass electrode are employed for regulating the introduction of aqueous acid at a height of approximately ⅓ of the normal depth of the liquid. Provision may be made for readjusting the rate of slurry withdrawal to maintain the depth of the liquid within a reasonable range. Initially the vessel is partially filled with distilled water and the acid solution is supplied in a quantity to lower the pH from about 7 to about 4. The dry fluidizable particles are allowed to fall onto the top surface of the liquid and to be suspended in the aqueous system whereby the acidic component reacts with the sodium silicate to form silica binder with the particles. The particles are suspended in the liquid of the continuous neutralization vessel for an average residence time of about 15 minutes prior to discharge through the bottom drain. The rate of supply of the approximately 0.1 Normal (about pH 1) aqueous acid supplied to the vessel is adapted to maintain a pH within a range from about 6.2 to about 7.8 at the glass electrode. After operating for a few hours, equilibrium conditions are established at which the rates of supply of 0.1 Normal acid and fluidizable particles and rates of withdrawal of a neutral (pH 6.2–7.8) suspension of particles are maintained in balance while providing an average residence time of the particles in the agitated suspension within a range from about 10 minutes to about 20 minutes. If desired the slurry at the drain may be sent to a settling tank, centrifuge, filter, or other suitable separating means, the fluidizable particles separated from the neutralization solution and re-suspended in water at a relatively high concentration of solids in preparing a slurry pumped to the ion exchange tower.

An important advantage of the continuous neutralization of the sodium silicate binder within the fluidizable particles is the preservation of the crystal structure of the crystalline zeolitic component. In batch operation in which the fluidizable particles are immersed in aqueous acid having a pH lower than about 4, the neutralized product generally contains less crystalline zeolite than the freshly sprayed fluidizable particles. The crystalline zeolites can be significantly decomposed by treatment with relatively strong acids, but prior to the present invention were generally not deemed extremely sensitive to solutions having only a slightly acidic pH. It is surprising that the crystalline zeolite in the aluminosilicate carrier would be so significantly damaged by the relatively mild acid conditions of batch neutralization.

Using the previously described continuous neutralization vessel, freshly spray dried fluidizable particles comprising aluminosilicate carrier, a crystalline sodium zeolite, and sodium silicate binder were supplied to the vessel at a variable rate of about 30 g./min., in response to the demand attributable to the supply of an aqueous acid at a rate of about 70 g./min. The aqueous acid consisted of 93% distilled water and 7% by weight of sulfuric acid. This 7% sulfuric acid solution was 0.0715 molar or 0.143 Normal, and had a pH of about 0.9. It was mixed so rapidly with the agitated slurry that no particles were long subjected to conditions of extremely low pH. Whenever the pH at the glass electrode was as low as pH 6.2, the feed rate of the particles was increased. Whenever the glass electrode pH measurement was as high as pH 7.8, the feed rate of the particles was decreased. The fluidizable particles thus were supplied at a rate adapted to neutralize the acid fed into the vessel and maintain the pH at about the desired value of 7. The average residence time of the fluidizable particles in the continuous neutralization vessel was about 18 minutes.

The fluidizable catalyst neutralized continuously in the manner previously described was exchanged with aqueous ammonium salt solution by countercurrent treatment, thermally deammoniated, artificially aged by steaming at 815° C. and 846° C. and then tested as a cracking catalyst. Inasmuch as the percent conversion was less after treatment at 846° C. than after treatment at 815° C., the data indicated that the accelerated aging tests were in the temperature zone at which significant deactivation rates are measurable. The catalyst has such a remarkably high stability to steam at the temperature reported in the literature for some accelerated aging tests that no difference in percentage conversion would be apparent by tests differing by only 31° C. at such lower levels.

In a control run using the same freshly spray dried fluidizable particles but subjected to batch neutralization, the zeolite content of the acid treated particles was adversely affected. The X-ray diffraction measurements indicated that the crystalline content had been reduced to about 20% from about 26% by batch neutralization, thus destroying approximately ¼ of the active catalytic component. The batch-neutralized particles were exchanged countercurrently with aqueous ammonium salt and thermally deammoniated to provide fluidizable cracking catalyst particles. The catalyst was artificially aged in steam at 815° C. and 846° C., after which the catalyst provided performance data as set forth in the following table, whereby it was shown that continuous neutralization was superior to batch neutralization.

|  | After accelerated aging at— | | | |
|---|---|---|---|---|
|  | 815° C. | | 846° C. | |
|  | Batch | Contin. | Batch | Contin. |
| Gasoline, vol. percent | 65.4 | 68.2 | 56.7 | 59.2 |
| Gasoline, wt. percent | 58.7 | 60.1 | 50.0 | 52.1 |
| Coke, wt. percent | 1.5 | 1.8 | 1.0 | 1.4 |
| Gas, wt. percent | 12.5 | 14.5 | 7.9 | 10.0 |
| Gas gravity | 1.56 | 1.60 | 1.46 | 1.53 |
| Conversion, wt. percent | 71.6 | 76.3 | 58.8 | 63.5 |
| Selectivity, wt. percent | 80.5 | 78.7 | 85.0 | 82.0 |

A continuous ion exchange tower features an upright cylindrical tube having a diameter of about 10 cm. and a height of about 2 m. A plurality of rods extend from the bottom toward the top of the tower and spacers around the rods support a plurality of horizontal partitions dividing the tower into 13 compartments. Each partition has an opening of 3.8 cm. at the axis of the tube. A motor driven shaft at the axis of the tube is equipped with stirring arms at about the middle of each compartment below the uppermost partition. The stirring arms extend from the shaft to a diameter approximately equal to the diameter of the opening in the partition. Beneath the bottom partition is a conical draw-off section from which the product slurry may be withdrawn. Near the top rim of the tower is a waste withdrawal conduit for the removal of the sodium-contaminated solution. A feed pipe extends for about 30 cm. downwardly to a zone near the uppermost partition whereby a settling zone exists in which small particles are not lifted to the waste withdrawal conduit. The particles comprising crystalline sodium zeolite are slurried and pumped into said settling zone above the uppermost partition. The particles settle through the tower and are agitated in each compartment, and are withdrawn as a slurry at the funnel shaped bottom outlet. An ammonium salt inlet conduit at about the level of the stirring arms in the lowermost compartment of the tower is employed to inject an aqueous ammonium salt solution into the tower so that it may flow slowly upwardly into the tower at a rate adapted to provide a ratio of ammonium ion to sodium ion within the acceptable range. The aqueous slurry of neutralized fluidizable particles is supplied to the upper portion of the tower at a rate relative to the rate of supply of the aqueous ammonium salt to maintain a desired ratio of ammonium ion to sodium ion in the effluent from the tower.

The fluidizable particles settle through the solution and are agitated in each compartment by the action of the stirring arms extending from the mixer shaft. Improved contact of solids and liquid with considerably less by-passing and backflow results from the use of the compartmentalized column coupled with the agitation in each compartment.

In a series of tests, a plurality of samples of neutralized fluidizable particles were subjected to ammonium ion exchange in the continuous tower for the purpose of evaluating the effectiveness of countercurrent ammonium ion exchange. Thus it was established that the tower performed satisfactorily for the ammonium exchange of catalyst precursor particles comprising crystalline sodium zeolite such as sodium faujasite to prepare cracking catalyst particles comprising crystalline ammonium zeolite such as ammonium faujasite.

OBSERVATIONS CONCERNING METHOD

If fluidizable particles comprising sodium silicate are dispersed in water and thereafter an acidic solution (e.g., $NH_4NO_3$) is added, various undersirable reactions occur. Some of the sodium silicate in the fluidizable particles can be leached by distilled water, so that subsequent addition of acid can lead to the formation of a solid gel. Injection of a slurry prepared from water and fluidizable particles into a column containing ammonium nitrate causes the composition to gellify, and bridge and plug the column. Plunging of the fluidizable particles into an aqueous solution having an acid strength corresponding to a range from about 0.1 to 1 molar overcomes such gelation problems; but the pH of the solution must be kept above about 4 to prevent appreciable damage to the zeolite. The proportions of cracking catalyst particles to acid should be such that the amount of acid will react with from about 40% to about 110% of the sodium silicate content of the fluidizable particles. It is generally desirable to deem as sodium silicate, not only any sodium silicate added as such as a binder, but also all soluble sodium and silica from any source in the solids. The acid is generally less than required for stoichiometric reaction with all of the sodium in the solids and removal of the sodium from the sodium faujasite components is accomplished by an ion exchange procedure subsequent to such initial adequate acidification procedure. Although ammonium nitrate is relatively expensive as an acid, a sufficient quantity of a sufficiently concentrated solution of ammonium nitrate can serve for the initial acidification step if rapid mixing prevents dissolution of the sodium silicate. Whether the fluidizable particles are prepared in accordance with previously described illustrative procedures A, B, C, or any modification thereof is less important than the composition and size distribution (i.e., cracking catalyst fluidization standards) of the particles.

The mixture of fluidization particles and 0.2–1.0 molar sulfuric acid solution should be agitated for from about 3 to about 90 minutes, an agitation period for about 15 minutes often being desirable. The action of the acid in leaching the sodium from the sodium silicate component also serves to transform the previously silicate silica into a more firmly bonded silica, whereby the attrition resistance of the final catalyst particles is enhanced. It is important that the pH of the system resulting from the dispersion of the fluidized particles in the dilute sulfuric acid should be below 11.0 in order to minimize solubilizing of the silica binder and that the pH should be higher than 4.0 in order to minimize damage to the sodium faujasite component of the fluidizable particles.

The ammonium salt solution may be prepared from ammonium sulfate, ammonium nitrate, ammonium chloride or other moderately priced ammonium salts.

The particles are transferred to the countercurrent zone. It is very advantageous to permit the fluidizable catalyst particles to settle downwardly in a column through which a hot solution of ammonium salt is flowing upwardly, but other arrangements for countercurrent treatment of the hot aqueous ammonium salt with the fluidizable catalyst particles are possible. Of importance is the fact that the fluidizable particles of the present invention undergo ammonium ion exchange with great rapidity, so that an ammonium exchange can be conducted within a few minutes instead of hours or days. After the withdrawal of the fluidizable particles from the countercurrent treatment zone, the particles are washed with water. Subsequent to the manufacture of the ammonium form cracking catalyst particles, they are heated to a temperature higher than that prevailing in the cracking zone (e.g., at the temperature of the regenerator portion of the cracking installation) to stabilize the activity and selectivity of the cracking catalyst. In thus stabilizing the catalyst, substantially all of the water and ammonia are driven off so that the cracking catalyst is of the hydrogen faujasite type.

Obviously, many modifications and variations of the invention as hereinbefore set forth may be made without departing from the spirit and scope thereof, and therefore only such limitations should be imposed as are indicated in the appended claims.

What is claimed is:

1. In a method of manufacturing fluidizable particles comprising crystalline ammonium zeolite in an amorphous aluminosilicate matrix comprising both silica derived from sodium silicate and aluminosilicate derived from calcined kaolin, which particles are precursors for cracking catalyst, the improvement which consists of: preparing an aqueous system comprising water, sodium silicate, crystalline sodium zeolite, and additional amorphous aluminosilicate derived from calcined kaolin; spray drying said aqueous system to prepare dry fluidizable particles; rapidly mixing the fluidizable particles with a quantity of aqueous acid stoichiometrically equivalent to from about 60% to about 110% of the sodium ion of the sodium silicate content of the fluidizable particles in a mixing zone at mixing speeds so rapid that silica binder forms from the sodium silicate within the fluidizable particles while preserving substantially all of the crystalline sodium zeolite of the particles in the crystalline sodium zeolite form, the aqueous product from said mixing having a pH within a range from about pH 5.5 to about pH 8.5, the average residence time of the fluidizable particles in the mixing zone being from about 10 to about 20 minutes; subjecting the fluidizable particles featuring such silica binder to a hot aqueous solution of ammonium salt in at least one countercurrent zone at conditions at which the ammonium salt solution flows countercurrently to the flow of the fluidizable particles therein to exchange ammonium ion for sodium ion in the crystalline zeolite portion of the particles, where depleted solution and ammonium exchanged fluidizable particles are withdrawn at significantly spaced apart portions of the countercurrent zone; and removing excess ammonium salt from the ammonium exchanged fluidizable particles comprising crystalline ammonium zeolite in an aluminosilicate matrix.

2. The method of claim 1, in which the fluidizable particles settle through a stream of ammonium salt flowing upwardly at a rate entraining few particles of the fluidizable size range.

3. The method of claim 1 which produces precursor particles comprising synthetic ammonium faujasite.

4. The method of claim 3 in which the fluidizable particles comprising sodium silicate are continuously treated with aqueous acid, whereby the withdrawn slurry of fluidizable particles has a pH within a range from about pH 5.5 to about pH 8.5, and in which the rates of supply of acid and fluidizable particles and rates of withdrawal of the aqueous slurry are regulated to maintain an average residence time from about 10 to about 20 minutes.

5. The method of claim 3 in which fluidizable particles featuring silica binder are subjected to upflowing hot aqueous solution of ammonium salt in a treatment zone having a plurality of settling zones through which the fluidizable particles settle, there being agitation of the particles in a plurality of said settling zones.

References Cited

UNITED STATES PATENTS

| | | | |
|---|---|---|---|
| 3,055,841 | 9/1962 | Gladrow et al. | 252—455 |
| 3,140,252 | 7/1964 | Frilette et al. | 252—455 X |
| 3,262,890 | 7/1966 | Mitchell et al. | 252—455 |
| 3,296,151 | 1/1967 | Heinze et al. | 252—455 X |
| 3,382,187 | 5/1968 | Drost et al. | 252—455 |

DANIEL E. WYMAN, *Primary Examiner.*

C. F. DEES, *Assistant Examiner.*

U.S. Cl. X.R.

23—112

PO-1050
(5/69)

UNITED STATES PATENT OFFICE
CERTIFICATE OF CORRECTION

Patent No. 3,451,948          Dated June 24, 1969

Inventor(s) Charles E. Scott

It is certified that error appears in the above-identified patent and that said Letters Patent are hereby corrected as shown below:

Column 2, line 22, after "micron" insert --are first--

Column 2, line 53, "matrx" should read --matrix--

Column 2, line 59, "cationo" should read --cation--

Column 3, line 49, "$H_2O/Al_2O_3$" should read --$Na_2O/Al_2O_3$--

Column 7, line 46, "undersirable" should read --undesirable--

Column 7, line 67, "components" should be singular

Column 8, line 4, "fluidization" should read --fluidizable--

Claim 1, line 29 thereof, "where" should read --whereby--

SIGNED AND
SEALED
APR 28 1970

(SEAL)
Attest:

Edward M. Fletcher, Jr.
Attesting Officer

WILLIAM E. SCHUYLER, JR.
Commissioner of Patents